United States Patent
Dong et al.

(10) Patent No.: US 9,497,129 B2
(45) Date of Patent: Nov. 15, 2016

(54) METHODS AND DEVICES FOR PROVIDING A SELF-STRETCHING POLICER

(71) Applicant: Cisco Technology, Inc., San Jose, CA (US)

(72) Inventors: Xuanming Dong, Cupertino, CA (US); Cesare Cantu', Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 786 days.

(21) Appl. No.: 13/860,001

(22) Filed: Apr. 10, 2013

(65) Prior Publication Data
US 2014/0307544 A1 Oct. 16, 2014

(51) Int. Cl.
*H04L 12/851* (2013.01)

(52) U.S. Cl.
CPC .................................. *H04L 47/2441* (2013.01)

(58) Field of Classification Search
CPC .................................................. H04L 47/2441
USPC .......................................................... 370/229
See application file for complete search history.

(56) References Cited

U.S. PATENT DOCUMENTS

| | | | |
|---|---|---|---|
| 6,826,150 B1 | 11/2004 | Bhattacharya et al. | |
| 2012/0005367 A1* | 1/2012 | Bettink | H04L 47/41 709/233 |

OTHER PUBLICATIONS

Cisco, "Catalyst 4500 Series Swtich Cisco IOS Software Configuration Guide", Release 12.2(50)SG, 2008, pp. 1-1250.*
AutoQoS Technical Presentation, 2002, 49 pages.
Cisco IOS Software Configuration Guide, Release 12.2SX, 2007, 1492 pages.
Cisco IOS Software Features and Hardware, Release 12.4, Product Bulletin No. 2852, 2006, 218 pages.
Cisco Nexus 7000 Series NX-OS Quality of Service Command Reference, Release 5.1(1), 2011, 132 pages.
"Configuring QoS Policy Propagation via Border Gateway Protocol," Cisco IOS Quality of Service Solutions Configuration Guide, 2002, pp. QC-49 to QC56.
Dierks, T., et al., "The Transport Layer Security (TLS) Protocol," Version 1.2, 2008, 72 pages.
Marques, P., et al., "Dissemination of Flow Specification Rules," 2009, 16 pages.
Zhang, R., et al., "BGP Design and Implementation," Chapter 4: Effective BGP Policy Control, Cisco Press, 2004, 46 pages.

* cited by examiner

*Primary Examiner* — Andrew Lai
*Assistant Examiner* — Albert Shih
(74) *Attorney, Agent, or Firm* — Meunier Carlin & Curfman LLC (57) ABSTRACT

An example method for providing a self-stretching policer in a Quality of Service (QoS) community including a root node and one or more agent nodes can include maintaining and enforcing a policer policy in the root node. The policer policy can include at least one packet classification rule and corresponding police action, and the policer policy can be enforced by taking the corresponding police action if a traffic flow violates the packet classification rule. The method can include collecting policer statistics and determining if the traffic flow violates the packet classification rule by greater than a predetermined threshold using the policer statistics. If the traffic flow violates the packet classification rule by greater than the predetermined threshold, the method can include transmitting the policer policy to one or more of the agent nodes.

20 Claims, 5 Drawing Sheets

METHODS AND DEVICES FOR PROVIDING A SELF-STRETCHING POLICER

BACKGROUND

Policing marks down or discards out-of-profile traffic to fulfill the Service Level Agreement (SLA), mitigate security threats such as DOS/DDOS attacks, alleviate traffic congestion and ensure high availability. As an important and effective Quality of Service (QoS) mechanism, policing is widely deployed by enterprises and service providers.

Various data plane statistics are maintained for each QoS policer in most packet-forwarding devices (e.g., switches, routers, etc.). Example command line interfaces (CLIs) and outputs showing data plane statistics for CISCO CATALYST 6K AND CISCO NEXUS 7K switches from CISCO SYSTEMS, INC., SAN JOSE, Calif. are discussed below. Policer statistics can describe dropped packets that are out-of-profile (e.g., violate the SLA). It should be understood that policer drops are different from queuing drops. For example, policer drops indicate that excess traffic from a source is above the specified rate limit, while queuing drops are symptoms of network congestion. If policer drops are observed, it can be beneficial to enforce the same QoS policing in the earliest possible upstream network devices (i.e., networking devices closest to misbehaving traffic sources). Otherwise, even though the policing is enforced in downstream network devices, the out-of-profile packets to be dropped inevitably waste networking resources, decrease good throughput, worsen congestion and cause more delay/jitter. However, due to application distribution, server virtualization, dynamic traffic patterns, complex networking topology, etc., it is not always straightforward to identify early in upstream network devices where a policer can be enforced. In many cases, out-of-profile traffic traverses through many network devices in the core before being dropped according to the policer policy.

Manual micro-level QoS policy reconfiguration is known in the art. For example, in response to a short-duration burst, a real-time alarm can be raised to promptly alert network administrators and trigger manual micro-level policer policy re-configuration. For example, it is possible to propagate QoS policies using a Border Gateway Protocol (BGP)-enabled device. A QoS policy can be manually configured/re-configured at the BGP-enabled device. The QoS policy can then be propagated to remote BGP-enabled devices via BGP messages and installed at the remote BGP-enabled devices (but not the local BGP-enabled device). QoS policy propagation via BGP is discussed in detail in Cisco Systems, Inc., Cisco IOS Quality of Service Solutions Configuration Guide: Configuring QoS Policy Propagation via Border Gateway Protocol, available at http://www.cisco.com/en/US/docs/ios/12_2/qos/configuration/guide/qcfprop.pdf. However, manual reconfiguration can be both tedious and prone to errors, especially due to application distribution, server virtualization, dynamic traffic patterns, complex networking topology, etc.

Additionally, automatic macro-level QoS policy reconfiguration is known in the art. Policer statistics can be collected during longer period of times (e.g., for days, weeks, or even longer) and then sent to a comprehensive network management system for traffic profiling. The network management system can automatically generate a set of QoS policies that is expected to better meet business needs with macro-level re-configuration. Using this type of solution, it is possible to intelligently generate and deploy QoS policies based on underlying network topology and network traffic profiles at different sites. CISCO AUTOQOS from CISCO SYSTEMS, INC., SAN JOSE, Calif. is one example and is discussed in detail in Cisco Systems, Inc., AutoQoS Technical Presentation (2006), available at http://www.cisco.com/en/US/prod/collateral/iosswrel/ps6537/ps6558/ps6613/ps6656/prod_presentatipr 0900aecd80313756.pdf. However, because statistics are collected over longer periods of time, the solution is not capable of immediately responding to short-duration bursts. Also, system-level configuration changes are required.

Further, distributed policing is also known. For example, distributed policing enables multiple devices across an entire network to police traffic flows that matches the same packet classification rules. According to distributed policing techniques, a single logical policing view across an entire network is synchronized by frequently reporting local policing control data and announcing global policing control data. Distributed policing is discussed in detail in U.S. Pat. No. 6,826,150 to Bhattacharya et al. Although distributed policing provides a mechanism to regulate misbehaving traffic flows in a real-time, it requires a complicated framework and associated control overhead to maintain a single logical policing view. In addition, each network device needs to provide resources for the same policing at all times.

SUMMARY

Self-stretching policers are provided herein. Self-stretching policers propagate an original policer policy from a root node (e.g., a node where the original policer policy is enforced) to one or more agent nodes in a QoS community. Optionally, the original policer policy can be stretched to one or more agent nodes in the QoS community when policer drops in the root node reach a predetermined threshold. Additionally, the original policer policy can optionally be withdrawn from one or more agent nodes in the QoS community. By implementing self-stretching policers as described herein, QoS policing can be enforced in a reactive, directional, distributive and collaborative way.

An example method for providing a self-stretching policer in a Quality of Service (QoS) community including a root node and one or more agent nodes can include maintaining and enforcing a policer policy in the root node. The policer policy can include at least one packet classification rule and corresponding police action, and the policer policy can be enforced by taking the corresponding police action if a traffic flow violates the packet classification rule. The method can also include collecting policer statistics and determining if the traffic flow violates the packet classification rule by greater than a predetermined threshold based on the collected policer statistics. If the traffic flow violates the packet classification rule by greater than the predetermined threshold, the method can include transmitting the policer policy to one or more of the agent nodes. Optionally, the policer policy can be installed on at least one of the one or more agent nodes.

Alternatively or additionally, the method can include collecting policer statistics by maintaining an in-profile metric related to packets of the traffic flow that do not violate the packet classification rule and maintaining an out-of-profile metric related to packets of the traffic flow that violate the packet classification rule.

Optionally, the method can include determining whether $$\frac{\text{the out-of-profile metric}}{(\text{the in-profile metric} + \text{the out-of-profile metric})} > \text{the predetermined threshold.}$$

If this equation is satisfied, the traffic flow violates the packet classification rule by greater than the predetermined threshold.

Alternatively or additionally, the method can include identifying a source of the traffic flow that violates the packet classification rule by greater than the predetermined threshold, selecting at least one upstream agent node arranged between the source of the traffic flow and the root node and transmitting the policer policy to the upstream agent node. Optionally, the upstream agent node can be an immediate upstream agent node.

Optionally, the method can include transmitting the policer policy to one or more of the agent nodes by transmitting a message comprising the packet classification rule, the corresponding police action and an enforcement period. The one or more agent nodes can enforce the policer policy during the enforcement period. Optionally, the one or more agent nodes can enforce the policer policy only during the enforcement period. The method can optionally further include transmitting a refresh message to one or more of the agent nodes to extend the enforcement period. Alternatively or additionally, the method can optionally include transmitting a delete message to one or more of the agent nodes to cancel the policer policy.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for providing a self-stretching policer in a QoS community, it will become evident to those skilled in the art that the implementations are not limited thereto, but are applicable for dynamically propagating other QoS policies.

As discussed above, methods and devices for providing a self-stretching policer are provided herein. A self-stretching policer dynamically stretches and withdraws the scope of QoS policing within a QoS community based on policer statistics. Implementing QoS policing in upstream node(s) closer to the misbehaving traffic source can be desirable. Optionally, implementing QoS policing in the upstream node(s) closest to the misbehaving traffic source can be desirable. If out-of-profile traffic will be dropped according to QoS policing, it is more efficient to drop the out-of-profile traffic closer to the misbehaving traffic source. Otherwise, out-of-profile traffic to be dropped will inevitably waste networking resources, decrease throughput, worsen congestion and/or cause more delay/jitter.

Providing a self-stretching policer as discussed herein can facilitate enforcing QoS policing in a reactive, directional, distributive and collaborative way, so that out-of-profile traffic can be punished as early as possible after it is detected to be offending a QoS community. Optionally, copies of a stretched QoS policing policy can have soft state. For example, copies of the stretched QoS policing policy can be automatically flushed away (e.g., purged, removed, deleted, etc.) from the upstream node(s) after expiration of a predetermined amount of time (e.g., an enforcement period). A self-stretching policer as discussed herein permits early out-of-profile traffic drops, facilitates QoS policy injection triggered by data plane traffic statistics, enables a back pressure mechanism with fine-grained flow information and reacts to dynamic application placement and traffic distribution changes introduced by server virtualization technology.

A number of QoS policing schemes are known in the art. For example, QoS policing can enforce traffic policing for each applied port or VLAN separately on a per-flow basis (e.g., micro-flow policer). Alternatively, QoS policing can enforce traffic policing across a plurality of ports/VLANs (e.g., aggregate policer). In an aggregate policer, QoS policy is applied cumulatively to all flows matching the criteria. A flow is defined as packets sharing a unique combination of parameters. Packets that match a particular set of defined parameters are considered to belong to the same flow. The parameters can be one or more packet-header fields including, but not limited to, source and destination IP address, source and destination port, source and destination MAC address, IP protocol and type of IP service. Although examples are provided herein with respect to micro-flow and aggregate policers, this disclosure contemplates that a self-stretching policer can be implemented in other types of QoS policing schemes.

QoS policing includes enforcing a policer policy. The policer policy includes one or more packet classification rules and associated police actions. When a traffic flow violates a packet classification rule, the policer is enforced by taking the corresponding police action, e.g., dropping one or more packets of the traffic flow. The policer policy is attached to an interface such as a port or VLAN of a packet-forwarding device (e.g., switch, router, etc.) for activation. Example policer policies discussed herein require source IP address or source MAC address to be included in the packet classification rules and include single-rate, two-color police actions. This disclosure contemplates that a self-stretching policer can be implemented for other types of policer policies.

An example micro-flow policer is shown below. The micro-flow policer in the example can be implemented in a CISCO CATALYST 6K switch from CISCO SYSTEMS, INC., SAN JOSE, Calif., for example.

```
!--- This enables QoS.
mls qos
!--- This defines the ACL to select user traffic.
access-list 100 permit ip any any
!--- This defines the traffic class for policing.
class-map match-all bar_cmap
  match access-group 100
!--- Only the source IP address is considered for flow creation
!--- on interfaces with this policy attached.
policy-map foo_pmap
  class bar_cmap
    police flow mask src-only 10000 3200 conform-act transmit exceed-act drop
!--- 1/1 is the uplink toward the users.
interface gigabit 1/1
  service-policy input foo_pmap
```

Example statistical output for the example micro-flow policer is shown below.

| Cat6K# show mls ip detail | | | | | | | |
|---|---|---|---|---|---|---|---|
| IP Destination | IP Source | Protocol | L4 Ports | Vlan | Xtag | L3-protocol | |
| 192.168.3.33 | 192.168.2.2 | udp | 555/555 | 0 | 1 | ip | |
| 192.168.3.3 | 192.168.2.2 | udp | 63/63 | 0 | 1 | ip | |
| [IN/OUT] | Ports | Encapsulation | RW-Vlan | RW-MACSource | RW-MACDestination | Bytes | |
| Gi1/1 | — | ARPA | 3 | 0030.7137.1000 | 0000.3333.3333 | 314548 | |
| Gi1/1 | — | ARPA | 3 | 0030.7137.1000 | 0000.2222.2222 | 314824 | |
| Packets | Age | Last Seen | QoS | Police Count | Threshold | Leak | |
| 6838 | 36 | 18:50:09 | 0x80 | 346197 | 62 * 2^5 | 3 * 2^0 | |
| 6844 | 36 | 18:50:09 | 0x80 | 346695 | 62 * 2^5 | 3 * 2^0 | |
| Drop | | Bucket | | Use-Tbl | | Use-Enable | |
| YES | | 1968 | | NO | | NO | |
| YES | | 1937 | | NO | | NO | |

An example aggregate policer is shown below. The aggregate policer in the example can be implemented in a CISCO NEXUS 7K switch from CISCO SYSTEMS, INC., SAN JOSE, Calif., for example.

```
switch(config)# show ip access-lists foo_acl
IP access list foo_acl
  statistics per-entry
  10 permit ip 192.26.10.0/24 any
  20 permit ip 10.196.199.0/24 any
switch(config)#
switch(config)# show running-config ipqos
!Command: show running-config ipqos
!Time: Sun May 13 15:54:33 2012
version 5.0(3)N2(2.02f)
```

```
class-map type qos match-all bar_cmap
  match access-group foo_acl
policy-map type qos foo_pmap
  class bar_cmap
    police cir 256000 conform transmit violate drop
interface ethernet1/1
  service-policy type qos input foo_pmap
switch(config)#
```

Example statistical output for the example aggregate policer is shown below.

```
switch(config)# show policy-map interface ethernet 1/1 type qos
Global statistics status : enabled
Ethernet1/1
Service-policy (qos) input: sample_pmap
policy statistics status: enabled
Class-map (qos): map (match-all)
  100000001 packets
  Match: access-group sample_acl
  police cir percent 20 bc 200 ms
  conformed 78962304 bytes, 2725540 bps action: transmit
  violated 4903769606 bytes, 169263372 bps action: drop
switch(config)#
```

Figure 1:
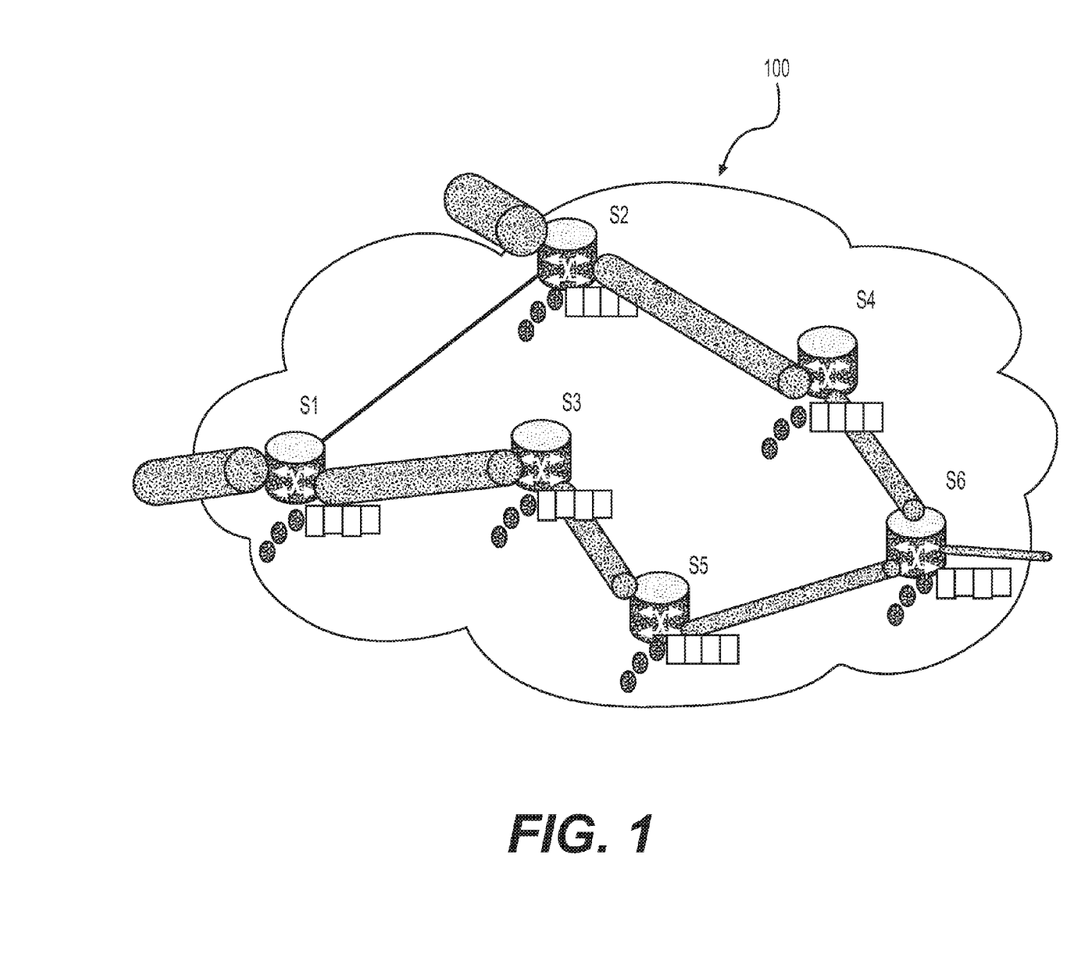
FIG. 1 is a block diagram illustrating a QoS community according to implementations discussed herein.

Referring now to FIG. 1, a block diagram illustrating an example QoS community 100 is shown. For example, a plurality of packet-forwarding nodes (or packet switching nodes) (e.g., routers, switches, etc.) in an autonomous system (AS) can provide internetworking capability for an enterprise campus, a service provider, etc. The QoS community 100 in FIG. 1 is a subset of packet switching nodes in the AS. The subset can optionally be a plurality of packet switching nodes that form a strongly-connected component in the AS. For example, the strongly-connected component of the AS can include a plurality of packet switching nodes where there is a path from each packet switching node to every other packet switching node without any intermediate packet switching node that does not support the self-stretching policer. Additionally, the QoS community 100 can include a root node and a plurality of agent nodes. The root node can be the node where an original policer policy is applied (e.g., installed on local resources). The original policer policy can be stretched within/throughout the QoS community 100. For instance, the agent nodes can receive the self-stretching policer policy from the root node, for example, and install and/or forward the self-stretching policer policy. The agent nodes can receive the self-stretching policer from the root node or other agent nodes. In FIG. 1, the QoS community 100 includes packet switching nodes S1-S6. Packet switching node S6 can be the root node and packet switching nodes S1-S5 can be the agent nodes, for example. It should be understood that the QoS community 100 shown in FIG. 1 is only an example and that the QoS community 100 can include more or less elements than shown in FIG. 1. Additionally, the packet switching nodes S1-S6 can be coupled through one or more communication links. This disclosure contemplates the communication links are any suitable communication link. For example, a communication link may be implemented by any medium that facilitates data exchange between the packet switching nodes S1-S6 including, but not limited to, wired, wireless and optical links.

Figure 2:
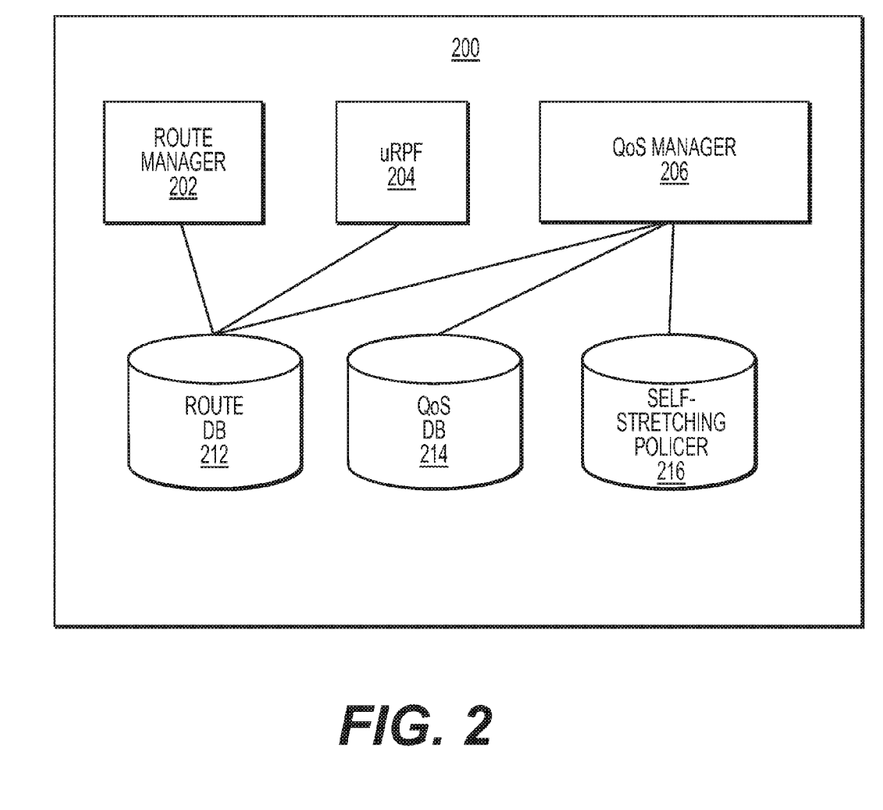
FIG. 2 is a block diagram illustrating a software architecture for implementing a self-stretching policer in a packet-forwarding node.

Referring now to FIG. 2, a block diagram illustrating an example software architecture 200 for implementing a self-stretching policer is shown. The example software architecture 200 can include a route manager module 202 (e.g., a routing information base "RIB"), a unicast reverse path forwarding ("uRPF") module 204, a QoS manager module 206, a route database 212 (e.g., a forwarding information base ("FIB")), a QoS database 214 and a self-stretching policer database 216. The software architecture 200 can optionally be implemented in each of the packet forwarding nodes S1-S6 of the QoS community 100 of FIG. 1. It should be understood that the software architecture 200 shown in FIG. 2 is only an example and that the software architecture 200 can include more or less elements than shown in FIG. 2.

The route manager module 202 can be configured to store the route(s) generated by routing protocols and/or entered by the network administrator. One or more routing protocols exist that learn about remote networks from neighboring network nodes. The routing protocols can optionally run on the packet forwarding nodes S1-S6 of the QoS community 100 of FIG. 1, for example. The routing protocols can generate dynamic routes. Additionally, the network administrator can optionally enter static routes. Accordingly, the route manager module 202 can be configured to store these dynamic and/or static routes in hardware or in software tables in the data plane such as an application-specific integrated circuit ("ASIC") or the route database 212, respectively, for example. The route manager module 202 can optionally be configured to determine one or more routes (e.g., using a longest prefix matching route protocol) for a given destination address. The route manager module 202 can also optionally be configured to allow the QoS manager module 206 to query the unicast next-hop information for a given destination address. For example, the route manager module 202 can be configured to provide this information using inter-process communication ("IPC") messages or library application programming interfaces ("APIs").

Additionally, the uRPF module 204 can be configured to enable a packet forwarding node such as the packet forwarding nodes S1-S6 of FIG. 1, for example, to drop packets without a verifiable source address (e.g., a source IP address). For example, if a source address of a received packet does not match one of the source addresses in the route database 212, then the packet is dropped by the packet forwarding node. By enabling uRPF, source IP address spoofing is prevented, and it is possible to determine/track the upstream network nodes from which traffic is coming. For example, when uRPF is enabled the back/return path to the source IP address of an offending traffic flow and/or the upstream network nodes can be identified. To implement the self-stretching policers discussed herein, the packet forwarding nodes S1-S6 of FIG. 1 are required to determine upstream network nodes from which traffic is coming. Accordingly, the packet forwarding nodes S1-S6 are required to enable uRPF or a similar mechanism. It should be understood that the packet forwarding nodes S1-S6 of FIG. 1 can use any known mechanism to determine upstream network nodes from which traffic is coming, including mechanisms other than uRPF.

The QoS manager module 206 can be configured to manage QoS policy. For example, the QoS manager module 206 can be configured to receive QoS policy commands from the network administrator (e.g., via CLIs), store QoS Policy objects in a database (e.g., QoS database 214), program QoS policy into the hardware (e.g., ASICs) or software tables in the data plane (e.g., QoS database 214), collect statistics relevant to QoS policy, interact with other software modules for system/port/interface/VLAN events, etc. Additionally, the QoS manager module 206 can optionally be configured to poll various types of policer statistics including, but not limited to, in-profile byte count, out-of-profile byte count and packet count of each packet classification rule associated with the QoS policy. The QoS manager module 206 can also be configured to implement the self-stretching policers discussed in detail below. The QoS manager module 206 can be configured to transmit/receive self-stretching policer messages. For example, the QoS manager module 206 can be configured to listen to a reserved port (e.g., a TCP port) for self-stretching policer messages from neighboring nodes in the QoS community. Additionally, the QoS manager module 206 can be configured to transmit self-stretching policer messages to neighboring nodes in the QoS community. The format and content of self-stretching policer messages are discussed below.

As discussed above, a QoS community can include a root node and a plurality of agent nodes. The root node can be a node where an original policer policy (e.g., packet classification rule(s) and associated police action(s)) is applied. If policer drops are observed in the QoS community, enforcing the policer policy in the earliest possible upstream node(s) can prevent/reduce wasting networking resources, decreasing throughput, worsening congestion and increasing delay/jitter. A self-stretching policer can dynamically stretch and withdraw the scope of QoS policing within the QoS community. For example, the root node can be configured to transmit the policer policy to agent nodes in the QoS community. Optionally, the root node can be configured to transmit the policer policy when dropped packets exceed a predetermined threshold. The agent nodes can optionally be upstream nodes, for example, nodes closer to the offending source of traffic. Additionally, the agent nodes can be configured to install (and enforce) the policer policy upon receipt. Alternatively or additionally, the agent nodes can be configured to forward the policer policy to other agent nodes (e.g., nodes farther upstream in the QoS community). The policer policy can optionally be withdrawn, for example, when the offending traffic source disappears or is no longer exceeding the SLA. Alternatively or additionally, the agent nodes can optionally be configured to stop enforcing the policer policy after a period of time such as an enforcement period, for example.

Example self-stretching policer CLI commands are provided below. For example, an example command to [disable] enable a self-stretching policer can be:

[no] feature self-stretching-policer

When the self-stretching policer is enabled, the self-stretching policer can dynamically stretch and withdraw a policer policy in the QoS community. An example command to define the policer policy can be:

```
police [ self-stretching [if-drop-exceed percent 50] [duration 2
hours] ] cir 256000 conform transmit violate drop
```

The "police cir 256000 conform transmit violate drop" portion of the example command defines a 1-rate (e.g., 256000 bytes/sec), 2-color (e.g., conform or violate) policer policy. When the traffic conforms to the rate, the traffic is transmitted. When the traffic violates (e.g., exceeds) the rate, the traffic is dropped. Additionally, the "self-stretching [if-drop-exceed percent 50] [duration 2 hours]" portion of the example command defines the self-stretching policer parameters. The "if-drop-exceed percent 50" defines the predetermined threshold, in this example, 50%. This disclosure contemplates that the predetermined threshold can be more or less than 50% such 90%, 80%, 70%, . . . 10%, for example. The predetermined threshold can be a ratio or percentage of out-of-profile traffic (e.g., dropped packets) to total traffic (e.g., the sum of in-profile and out-of-profile traffic). For example, the predetermined threshold can be defined as $$\frac{\text{an out-of-profile metric}}{(\text{an in-profile metric} + \text{an out-of-profile metric})}.$$

The metric can include, but is not limited to, a packet count, a byte count, etc. It should be understood that the metric can be any representation of the amount of dropped traffic to the amount of total traffic. In other words, when the amount of policer drops reaches a predetermined level relative to the total traffic, the policer policy can be dynamically stretched from the root node to one or more of the agent nodes in the QoS community.

Optionally, the self-stretching policer can stretch a policer policy within the QoS community for a predetermined amount of time (e.g., an enforcement period). For example, the "[duration 2 hours]" defines the lifetime of the policer policy in the one or more agent nodes, in this instance, 2 hours. This disclosure contemplates that the duration can be more or less than 2 hours such 30 minutes, 1 hour, 3 hours, 4 hours, etc., for example. After expiration of the enforcement period, the one or more agent nodes that installed the policer policy can uninstall/delete the policer policy. The policer policy can therefore be withdrawn automatically when it is no longer needed. Optionally, the root node can periodically renew/refresh the policer policy to keep it active in the agent nodes.

As discussed above, the packet switching nodes can be configured to transmit self-stretching policer policies, for example, to upstream nodes. Optionally, the packet switching nodes can be configured to listen to a reserved port such as a reserved TCP port, for example, for self-stretching policer messages. TCP can optionally be used as a transport protocol to simplify the design and implementation without considering fragmentation, reliability, and packet ordering, etc. Example self-stretching policer messages are provided below. An example "ADDIFY" message for adding/modifying a self-stretching policer policy can be:

```
 0                                                              3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver  | Code   |      TTL       |         Message Length        |
+-+-+-+-+-+-+-+-+-+-+-+-+-+-+-+-+-+-+-+-+-+-+-+-+-+-+-+-+-+-+-+-+
|                         Source IP Address                       |
+-+-+-+-+-+-+-+-+-+-+-+-+-+-+-+-+-+-+-+-+-+-+-+-+-+-+-+-+-+-+-+-+
|                            Subnet Mask                          |
+-+-+-+-+-+-+-+-+-+-+-+-+-+-+-+-+-+-+-+-+-+-+-+-+-+-+-+-+-+-+-+-+
|                         Sequence Number                         |
+-+-+-+-+-+-+-+-+-+-+-+-+-+-+-+-+-+-+-+-+-+-+-+-+-+-+-+-+-+-+-+-+
|                          Root Device ID                         |
+-+-+-+-+-+-+-+-+-+-+-+-+-+-+-+-+-+-+-+-+-+-+-+-+-+-+-+-+-+-+-+-+
|                            Policer ID                           |
+-+-+-+-+-+-+-+-+-+-+-+-+-+-+-+-+-+-+-+-+-+-+-+-+-+-+-+-+-+-+-+-+
|                     Self-Stretching Policer TLVs                |
|                                ...                              |
+-+-+-+-+-+-+-+-+-+-+-+-+-+-+-+-+-+-+-+-+-+-+-+-+-+-+-+-+-+-+-+-+
```

The ADDIFY message can be transmitted by the root node to stretch the self-stretching policer policy to one or more agent nodes. An example "DELETE" message for deleting a self-stretching policer policy can be:

```
 0                                                              3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Ver  | Code |     TTL      |          Message Length           |
+-+-+-+-+-+-+-+-+-+-+-+-+-+-+-+-+-+-+-+-+-+-+-+-+-+-+-+-+-+-+-+-+
|                         Source IP Address                       |
+-+-+-+-+-+-+-+-+-+-+-+-+-+-+-+-+-+-+-+-+-+-+-+-+-+-+-+-+-+-+-+-+
|                            Subnet Mask                          |
+-+-+-+-+-+-+-+-+-+-+-+-+-+-+-+-+-+-+-+-+-+-+-+-+-+-+-+-+-+-+-+-+
|                         Sequence Number                         |
+-+-+-+-+-+-+-+-+-+-+-+-+-+-+-+-+-+-+-+-+-+-+-+-+-+-+-+-+-+-+-+-+
|                          Root Device ID                         |
+-+-+-+-+-+-+-+-+-+-+-+-+-+-+-+-+-+-+-+-+-+-+-+-+-+-+-+-+-+-+-+-+
|                            Policer ID                           |
+-+-+-+-+-+-+-+-+-+-+-+-+-+-+-+-+-+-+-+-+-+-+-+-+-+-+-+-+-+-+-+-+
```

The DELETE message can be transmitted by the root node to delete/withdraw the self-stretching policer policy from one or more agent nodes. Optionally, the DELETE message can be used prior to expiration of the lifetime of the self-stretching policer policy. As discussed above, it should also be understood that the agent nodes can also be configured to forward the policer policy to other nodes.

A description of each field of the example ADDIFY and DELETE messages are provided below. It should be understood that the ADDIFY and DELETE messages are provided only as examples and that self-stretching policer messages having more or less fields and containing more or less information can be used.

Ver (4 bits)—The version field provides the version of current self-stretching policer message format and TLV (Type, Length, and Value) format.

Code (4 bits)—The code field designates the operation type requested by sender to receiver. For example, ADDIFY is specified to add a new self-stretching policer policy or to modify an existing self-stretching policer policy. An existing self-stretching policer policy is modified when the policer ID is the same and from the same node, for example, a node having the same source port and source address. DELETE is specified to delete an existing self-stretching policer policy with a given policer ID from the same node, for example, a node having the same source port and source address.

TTL (8 bits)—Time-to-Live ("TTL") field specifies when the self-stretching policer message is to be discarded. For example, the TTL field is decremented by one each time the self-stretching policer message is forwarded.

Message Length (16 bits)—The message length field specifies the total length of the self-stretching policer message, in bytes, including the message header. Optionally, the self-stretching policer message itself and each Type, Length Value ("TLV") field (discussed below) starts and ends at a 4-byte aligned boundary. Optionally, zero-padding bytes can be inserted into the TLV fields so that the self-stretching policer message and each TLV field starts at a 4-byte aligned boundary.

Source IP Address (32 bits)—The source IP address field identifies the source IP address of an offending traffic flow that matches one of the packet classification rules associated with the original policer. The source IP address and the subnet mask can be used (e.g., by QoS manager module 206 of FIG. 2) to route current self-stretching policer messages to upstream agent nodes.

Subnet Mask (32 bits)—The subnet mask field identifies the subnetwork of the offending traffic flow. The subnet mask can be used with the source IP address to resolve the network portion of the address for a route lookup. Regular mask but not wildcard mask can be used for this field, e.g., "0" means "do not care". For example, subnet mask for source IP address of a host is 255.255.255.255, while subnet mask 0.0.0.0 means that bits need not match.

Sequence Number (32 bits)—The sequence number field provides a monotonically increasing number generated by the root node for each self-stretching policer message. The sequence number can start at 0 and increase by 1 whenever a new update about current self-stretching policer is transmitted by the root node. The sequence number can be used by agent nodes to ignore out-of-sequence or duplicate self-stretching policer messages due to multiple source IP addresses and multipath routing.

Root Device ID (32 bits)—The root device ID field provides an identifier (e.g., a 32-bit identifier) for the root node. Optionally, the root device ID can be the IP address of root node that initially propagates self-stretching policer message.

Policer ID (32 bits)—The policer ID field provides a unique identifier for each policer policy applied at the root node. The policer ID can be copied by each intermediate node as the policer policy propagates through the QoS community.

Self-Stretching Policer TLVs (variable length)—The self-stretching policer TLV fields can be used to encode the packet classification rules and associated police actions of a self-stretching policer policy.

As discussed above with regard to FIG. 2, each packet switching node (e.g., packet switching nodes S1-S6 of FIG. 1) can include a QoS manager module 206 as part of its software architecture 200. The QoS manager module 206 can be configured to implement the self-stretching policers as described herein. For example, the QoS manager module 206 can maintain the self-stretching policer database 216. The self-stretching policer database 216 can store one or more policer policies. Each policer policy can be uniquely identified. For example, each policer policy can optionally be identified by a root device ID (e.g., the source IP address of the root node) and/or the policer ID (e.g., the unique identifier for a policer policy).

The QoS manager module 206 of a root node (e.g., a packet switching node) can be configured to periodically poll for policer statistics, such as an in-profile metric, an out-of-profile metric, a packet count, etc., for each packet classification rule for each policer policy applied at the root node. The metric can include, but is not limited to, a packet count, a byte count, etc. When the self-stretching policer is enabled on the root node, the QoS manager module 206 can be configured to determine an amount by which a traffic flow exceeds (or violates) a packet classification rule. Optionally, the amount by which the traffic flow exceeds the packet classification rule can be determined with reference to the total traffic flow. For example, the QoS manager module 206 can optionally be configured to determine an amount of out-of profile traffic as compared to an amount of total traffic (e.g., the sum of out-of-profile and in-profile traffic). For example, the QoS manager module 206 can be configured to compute the following ratio:

$$\frac{\text{an out-of-profile metric}}{(\text{an in-profile metric} + \text{an out-of-profile metric})}.$$

A source of the traffic flow can be considered an offending traffic source when $$\frac{\text{an out-of-profile metric}}{(\text{an in-profile metric} + \text{an out-of-profile metric})}.$$

is greater than a predetermined threshold. As discussed above, the predetermined threshold can be a percentage of the total traffic flow such as, but not limited to, 10%, 20%, 30%, . . . 90%, etc. Additionally, a policer policy can be stretched throughout the QoS community, for example to one or more agent nodes that are located closer to the offending traffic source, when the QoS manager module 206 determines that $$\frac{\text{an out-of-profile metric}}{(\text{an in-profile metric} + \text{an out-of-profile metric})} > \text{the predetermined threshold}.$$

After the QoS manager module 206 determines that an offending traffic source exists, the QoS manager module 206 can be configured to identify the offending traffic source. By identifying the offending traffic source, the QoS manager module 206 can then transmit the policer policy to one or more agent nodes (e.g., upstream nodes in the QoS community) located closer to the offending traffic source. For example, the QoS manager module 206 can be configured to identify a set of source IP addresses (not necessarily a host IP address) and subnet masks that are behaving aggressively (e.g., violating the packet classification rule by more than the predetermined threshold). It should be understood that there are a number of methods to identify the source IP addresses and subnet masks behaving aggressively. This disclosure contemplates using any known method to identify the source IP addresses and subnet masks behaving aggressively. For example, in the case of the microflow policer discussed above, all of the information for the traffic flows, including source IP addresses, is available to the QoS manager module 206, and the source IP addresses and subnet masks are therefore identifiable. Alternatively, in the case of the aggregate policer discussed above, the source IP addresses and subnet masks can be identified based on the policer statistics and the statistics for each of the packet classification rules. For example, the QoS manager module 206 can determine the average packet count for all of the packet classification rules and then identify all source IP addresses and subnet masks from the packet classification rules with above-average packet counts.

After the QoS manager module 206 identifies the source addresses and subnet masks behaving aggressively, the QoS manager module 206 can be configured to transmit a self-stretching policer message including the policer policy to one or more agent nodes in order to stretch the policer policy within the QoS community. The self-stretching policer message can optionally be the ADDIFY message discussed in detail above. For example, the ADDIFY message can include the root device ID of the root node, the policer ID of the policer policy, a sequence number set to 0, etc. The policer policy can be encoded in the self-stretching policer TLVs discussed above. Optionally, the QoS manager module 206 can transmit the self-stretching policer message to one or more upstream agent nodes. Optionally, the upstream agent nodes can be immediate upstream agent nodes. The QoS manager module 206 can select one or more agent nodes based on the source IP addresses and subnet masks associated with the offending traffic flow. For example, the QoS manager module 206 can optionally obtain one or more agent nodes by route lookup based on the source IP addresses and subnet masks using the route database 212. Optionally, when the packet classification rule of the policer policy is based on a Layer 2 header, the source MAC address can be part of the packet classification rule and one or more agent nodes can be identified by lookup in a MAC table. Optionally, the packet classification rules of a self-stretching policer policy that is propagated through the QoS community can include a subset of the original packet classification rules, for example, if one or more of the packet classification rules are not being violated. In other words, the QoS manager module 206 can be configured to transmit only the packet classification rules of the policer policy that are currently being violated.

Additionally, the QoS manager module 206 can be configured to modify a policer policy previously transmitted to one or more agent nodes in the QoS community. For example, the QoS manager 206 can optionally send another ADDIFY message, which is discussed in detail above. Optionally, the QoS manager module 206 can transmit the ADDIFY message to fewer agent nodes. The ADDIFY message can include the same root device ID and the same policer ID of a previous ADDIFY message. In addition, the ADDIFY message can include a higher sequence number as compared to the previous ADDIFY message. By increasing the sequence number, the one or more agent nodes receiving the ADDIFY message can determine that the previous policer policy is to be modified. Additionally, the modified policer policy can be encoded in the self-stretching policer TLVs discussed above. Alternatively or additionally, the QoS manager module 206 can be configured to delete a policer policy previously transmitted to one or more agent nodes in the QoS community. For example, the QoS manager module 206 can transmit a DELETE message discussed above to delete a policer policy. The DELETE message can include the root device ID of the root node and the policer ID of the policer policy, which allows the receiving agent nodes to identify the policer policy to delete. By deleting a QoS policy from one or more agent nodes, the policer policy is withdrawn (e.g., no longer applied at one or more agent nodes). The policer policy can optionally be withdrawn when it is no longer needed such as when an offending source goes away. Alternatively or additionally, the QoS manager module 206 can transmit a DELETE message when the self-stretching policer is disabled, for example, at the CLI by the network administrator.

The QoS manager module 206 of an agent node can be configured to listen to a reserved port (e.g., a TCP port) for self-stretching policer messages (e.g., ADDIFY and DELETE messages). Upon receipt of a self-stretching policer message, the QoS manager module 206 can be configured to extract information encoded in the message, for example, in the self-stretching policer TLVs, and store the information in the self-stretching policer database 216. For example, when the QoS manager module 206 receives an ADDIFY message, the QoS manager module 206 can be configured to compare the root device ID and policer ID of the message against the policer policies stored in the self-stretching policer database 216. If the policer policy is new, the policer policy encoded in the self-stretching policer TLVs can be stored in the self-stretching policer database 216 (and optionally associated with the root device ID and/or policer ID), and the QoS manager module 206 can allocate required hardware and/or software resources and program relevant resources for the policer policy. If the agent node lacks resources or capabilities to add the new policer policy, the QoS manager module 206 can instead log the event.

If the policer policy appears in the self-stretching policer database 216, the QoS manager module 206 can use the sequence number of the self-stretching policer message to determine whether the self-stretching policer message is a duplicate (e.g., already received by the agent node). For example, if the sequence number of the self-stretching policer message is less than or equal to the sequence number associated with the policer policy stored in the self-stretching policer database 216, the QoS manager module 206 can discard the self-stretching policer message because it is a duplicate message. Alternatively, if the sequence number of the self-stretching policer message is greater than the sequence number associated with the policer policy stored in the self-stretching policer database 216, the QoS manager module 206 can be configured to either restart of the enforcement period of the policer policy and/or modify the policer policy stored in the self-stretching policer database 216 and reprogram related hardware or software resources associated with the policer policy.

In addition, when the QoS manager module 206 receives a DELETE message, which is discussed in detail above, the QoS manager module 206 can be configured to extract information encoded in the message, for example, the root device ID and policer ID and determine whether the policer policy is stored in the self-stretching policer database 216. If the policer policy is stored, the policer policy can be deleted/removed from the self-stretching policer database 216. Additionally, the self-stretching policer message can optionally be forwarded to one or more agent nodes.

Optionally, the QoS manager module 206 can be configured to forward the self-stretching policer message to one or more agent nodes. Optionally, the QoS manager module 206 can be configured to forward the self-stretching policer message to immediate upstream agent nodes in the QoS community. For example, similar to the QoS manager module 206 of the root node, the QoS manager module 206 can determine upstream agent node(s) by route lookup (e.g., in the route database 212) based on the source IP addresses and subnet masks associated with the offending traffic flow. The QoS manager module 206 can also optionally decrement the TTL field of the self-stretching policer message upon forwarding. It should be understood that the stretching behavior will be terminated in edge nodes of the QoS community and/or in nodes where the TTL field becomes zero.

Optionally, a soft-state approach can be used to maintain entries or records in self-stretching policer database 216. In other words, periodic refresh message(s) from downstream nodes can be used to keep each policer policy alive in the upstream nodes. For example, each self-stretching policer policy can be associated with an enforcement period, which determines the lifetime of the policer policy. The lifetime can be a period of time during which the upstream node(s) apply/enforce each self-stretching policer policy. For example, a length of the enforcement period can be set by the network administrator or can be a default value. The length can optionally be encoded as part of the self-stretching policer TLVs discussed above. The root node can optionally be responsible for periodically transmitting self-stretching policer messages to upstream agent nodes in order to refresh the policer policy. In this case, when the root node stops transmitting self-stretching policer messages to refresh the enforcement period, the self-stretching policer policies in the upstream agent nodes can expire and can optionally be removed/deleted from the self-stretching policer database 216. If the out-of-profile traffic comes back after the expired self-stretching policer policy is removed/deleted from upstream agent nodes, the same self-stretching policer policy can again be transmitted to the upstream agent nodes. If link utilization contributes to IP route cost, then the preferred routes may change as self-stretching policer policy is extended/withdrawn within the QoS community, which can result in network instability. Optionally to alleviate network instability, the length of the enforcement period can be set to a conservative, relatively long duration, which can help damp oscillation.

Figure 3A:
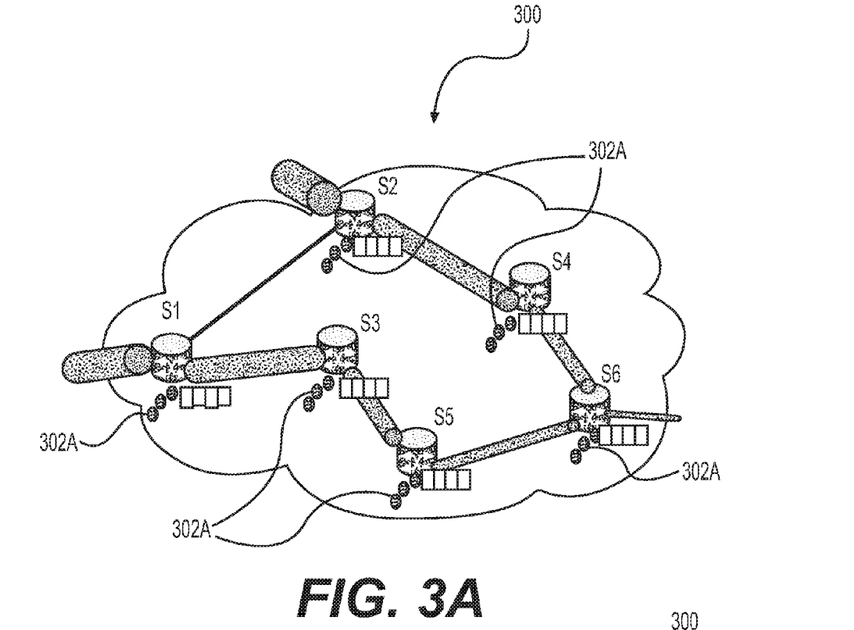
FIGS. 3A-3B are block diagrams illustrating an implementation of a self-stretching policer in a QoS community.
Figure 3B:
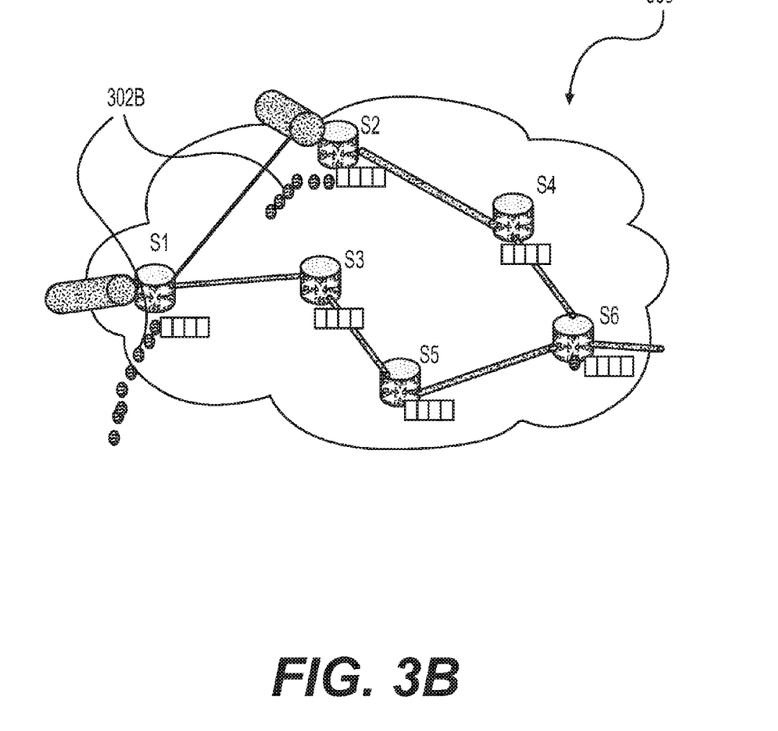

Referring now to FIGS. 3A-3B, block diagrams illustrating an implementation of a self-stretching policer as discussed herein are shown. The QoS community 300 shown in FIGS. 3A-3B can be similar to the QoS community 100 discussed above with regard to FIG. 1. For example, the QoS community 300 includes packet switching nodes S1-S6. Packet switching node S6 can be the root node and packet switching nodes S1-S5 can be the agent nodes, for example. Additionally, two subnets A.B.C.D/255.255.255.0 and E.F.G.H/255.255.255.0 can be directly connected to agent nodes S1 and S2, respectively. A policer policy can also be configured on an egress interface of root node S6, and two of the packet classification rules of the policer policy can have A.B.C.D/255.255.255.0 and E.F.G.H/255.255.255.0 matching criteria. As shown in FIGS. 3A-3B, policed traffic flows reach node S6 via two paths: S1→S3→S5→S6 and S2→S4→S6.

FIG. 3A illustrates the QoS community 300 without a self-stretching policer enabled. Specifically, without the self-stretching policer, out-of-profile traffic can cause large queuing delays 302A (and possibly queuing/policing drops) along the two paths: S1→S3→S5→S6 and S2→S4→S6.

FIG. 3B illustrates the QoS community 300 with the self-stretching policer enabled. For example, with the self-stretching policer enabled, root node S6 can detect that out-of-profile traffic drops reach a predetermined threshold, and root node S6 (e.g., the QoS manager module of root node S6) can generate two self-stretching policer messages with the same self-stretching policer TLVs and different source IP addresses (A.B.C.D/255.255.255.0 and E.F.G.H/255.255.255.0, respectively). Root node S6 can be configured to transmit the self-stretching policer messages to upstream agent nodes S1-S5 in the QoS community 300. For example, root node S6 can transmit the self-stretching policer messages to immediate upstream agent nodes S4 and S5, respectively. Agent node S4 can route the self-stretching policer message to agent node S1 via agent node S3, and agent node S4 can route the self-stretching policer message to agent node S2. As a result, the same self-stretching policer policy can be installed on agent nodes S1 and S2. As shown in FIG. 3B, the large queuing delays 302B (and possibly queuing/policing drops) caused by the traffic flows now occur at agent nodes S1 and S2 instead of at root node S6 (as shown in FIG. 3A).

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4:
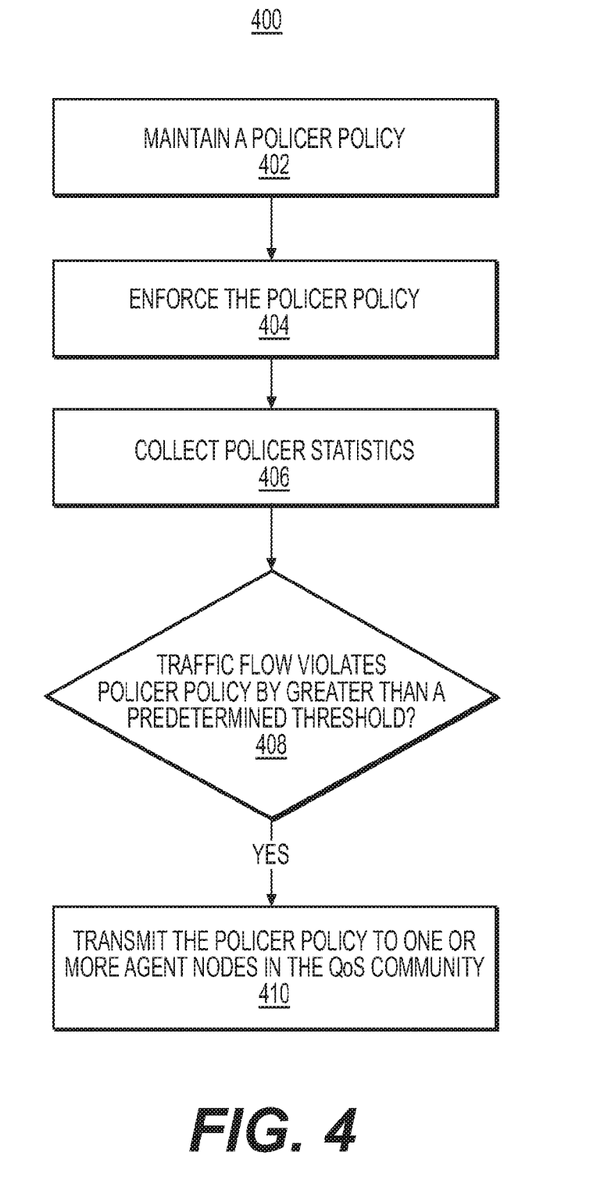
FIG. 4 is a flow diagram illustrating example operations for implementing a self-stretching policer.

Referring now to FIG. 4, example operations 400 for implementing the self-stretching policer are shown. For example, the example operations 400 can be implemented by a root node in a QoS community including the root node and one or more agent nodes. At 402, the root node can maintain a policer policy. The policer policy can include at least one packet classification rule and corresponding police action. At 404, the root node can enforce the policer policy, for example, by taking the corresponding police action if a traffic flow that violates the packet classification rule. At 406, the root node can collect policer statistics. At 408, the root node can determine if the traffic flow violates the packet classification rule by greater than a predetermined threshold based on the collected policer statistics. At 410, if the traffic flow violates the packet classification rule by greater than the predetermined threshold, the root node can transmit the policer policy to one or more of the agent nodes.

Figure 5:
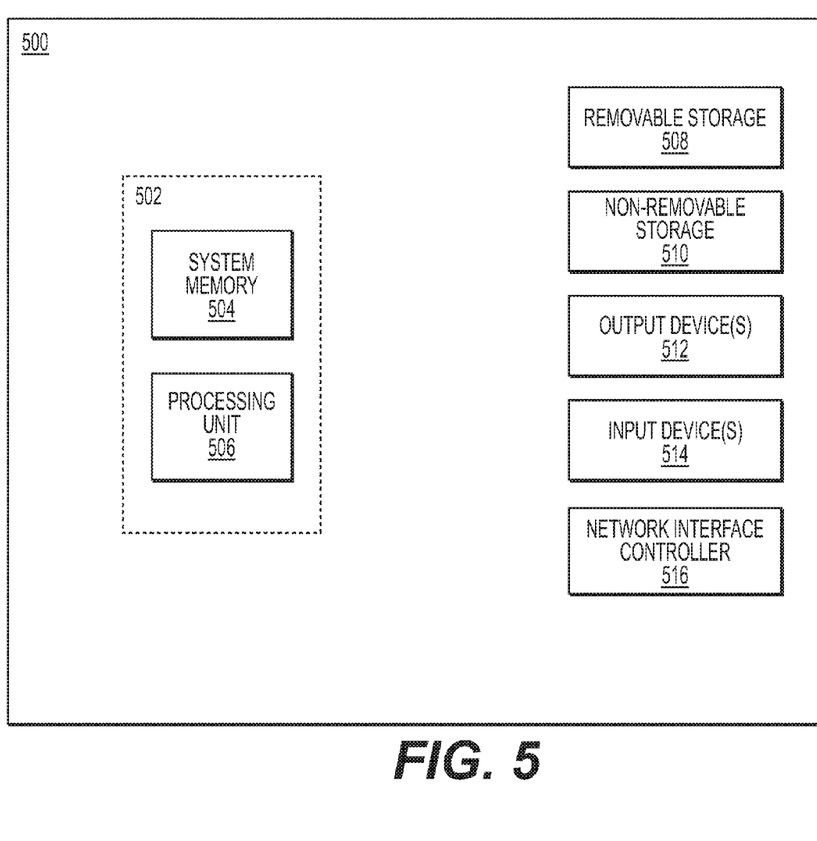
FIG. 5 is a block diagram illustrating an example computing device.

When the logical operations described herein are implemented in software, the process may execute on any type of computing architecture or platform. For example, referring to FIG. 5, an example computing device upon which embodiments of the invention may be implemented is illustrated. In particular, the packet-switching nodes (e.g., the root and agent nodes) discussed above may be a computing device, such as computing device 500 shown in FIG. 5. The computing device 500 may include a bus or other communication mechanism for communicating information among various components of the computing device 500. In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Computer-readable media refers to any media that is capable of providing data that causes the computing device 500 (i.e., a machine) to operate in a particular fashion. Various computer-readable media may be utilized to provide instructions to the processing unit 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

Computing device 500 typically includes a variety of computer-readable media. Computer-readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The self-stretching policers discussed herein provide a number of advantages. For example, QoS policing is enforced in a reactive, directional, distributive and collaborative way. Instead of using policer drop statistics to tune QoS policy at a Micro or Macro level, the self-stretching policers recursively propagate the original policer policy from a root node (e.g., the node where the original policer policy is applied) to upstream agent nodes in a QoS community when the policer drops in the root node reach a predetermined threshold. In this way, the policer policy can be timely performed in the earliest possible upstream nodes along the direction where dropped packets are coming from. Self-stretching policers aim to extend the original policer policy as far as possible in the QoS community and to drop out-of-profile traffic before the traffic travels farther in the QoS community, which ultimately wastes network resources. The self-stretching policers are relatively easy to implement and the control overhead is light. Moreover, a policer policy is optionally only stretched if dropped packets reach a customer-specified threshold, and optionally only nodes in the QoS community along the direction where traffic is coming from are required to program their resources. The self-stretching policers are also more scalable, and the approach is straightforward with on-demand resource consumption.

The self-stretching policers can also provide advantages to QoS policing in Data Center networks with Virtual Machine (VM) deployment. Server virtualization technology decouples a VM from the underlying host and allows the VM to be moved from one host to another while the VM is running, i.e., live migration. As a result, frequent changes of networking topology, application distribution and traffic patterns are expected. The inevitable uncertainty on shared upstream physical links makes it challenging to manually configure classification-based QoS policies on networking devices. However, even though VMs could change their physical locations, their layer 3 identification IDs, e.g., IPv4 addresses, will remain the same as before with many server virtualization technologies and will be recorded by the routing module in networking devices. By taking advantage of such routing capability in networking devices, self-stretching policers are able to keep track of most recent changes in VM placement and traffic distribution among physical links, so that the policing can be stretched all the way to closer upstream devices. For example, with reference to FIG. 3B above, if the offending traffic source moves from agent node S1 to agent node S2, the routing path to root node S6 might change from S1→S3→S5→S6 to S2→S4→56, and the new policing drops in root node S6 can trigger the self-stretching policer policy to be propagated along the most recent path S6→S4→S2 to the earliest agent node, e.g., agent node S2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing a self-stretching policer in a Quality of Service (QoS) community including a root node and one or more agent nodes, wherein the self-stretching policer dynamically stretches and withdraws the scope of the policer in the QoS community, the method comprising:
   maintaining a policer policy in the root node, the policer policy including at least one packet classification rule and corresponding police action;
   enforcing the policer policy in the root node by taking the corresponding police action if a traffic flow violates the packet classification rule; collecting policer statistics;
   determining if the traffic flow violates the packet classification rule by being greater than a predetermined threshold based on the collected policer statistics; and
   if a metric associated with the traffic flow violates the packet classification rule by being greater than the predetermined threshold, transmitting from the root node the policer policy, via one or more policer policy messages, to one or more of the agent nodes, including a given agent node adjacent and upstream to the root node from which the traffic flow is directed, wherein the transmitted policer policy message causes the given agent node to take corresponding police action if a traffic flow, including a short-duration burst traffic, received thereat, violates the packet classification rule of the policer policy message, and wherein the one or more transmitted policer policy messages cause the packet classification rule associated therewith to be dynamically stretched to and withdrawn from each of the one or more agent nodes that received a given policer policy message.

2. The method of claim 1, wherein the policer policy is installed on at least one of the one or more agent nodes.

3. The method of claim 1, wherein collecting policer statistics further comprises:
   maintaining an in-profile metric related to packets of the traffic flow that do not violate the packet classification rule; and
   maintaining an out-of-profile metric related to packets of the traffic flow that violate the packet classification rule.

4. The method of claim 3, wherein determining if a metric associated with the traffic flow violates the packet classification rule by being greater than a predetermined threshold further comprises determining whether $$\frac{\text{the out-of-profile metric}}{(\text{the in-profile metric} + \text{the out-of-profile metric})} > \text{the predetermined threshold}.$$

5. The method of claim 1, further comprising:
   identifying a source of the traffic flow that violates the packet classification rule by being greater than the predetermined threshold;
   selecting at least one upstream agent node arranged between the source of the traffic flow and the root node; and
   transmitting the policer policy to the upstream agent node.

6. The method of claim 1, wherein transmitting the policer policy to one or more of the agent nodes further comprises transmitting a message comprising the packet classification rule, the corresponding police action and an enforcement period, wherein the policer policy is enforced by the one or more agent nodes during the enforcement period.

7. The method of claim 6, further comprising transmitting a refresh message to one or more of the agent nodes to extend the enforcement period.

8. The method of claim 1, further comprising transmitting a delete message to one or more of the agent nodes to cancel the policer policy.

9. A non-transitory computer readable storage medium having computer-executable instructions stored thereon for providing a self-stretching policer in a Quality of Service (QoS) community including a root node and one or more agent nodes that, when executed by the root node, cause the root node to:
   maintain a policer policy including at least one packet classification rule and corresponding police action;
   enforce the policer policy by taking the corresponding police action if a traffic flow violates the packet classification rule;
   collect policer statistics;

determine if the traffic flow violates the packet classification rule by being greater than a predetermined threshold based on the collected policer statistics; and if a metric associated with the traffic flow violates the packet classification rule by being greater than the predetermined threshold, transmit the policer policy, via one or more policer policy messages, to one or more of the agent nodes, including a given agent node adjacent and upstream to the root node from which the traffic flow is directed, wherein the transmitted policer policy message causes the given agent node to take corresponding police action if a traffic flow, including a short-duration burst traffic, received thereat, violates the packet classification rule of the policer policy message, and wherein the one or more transmitted policer policy messages cause the packet classification rule associated therewith to be dynamically stretched to and withdrawn from each of the one or more agent nodes that received a given policer policy message.

10. The non-transitory computer readable storage medium of claim 9, wherein the instructions for collecting policer statistics comprise instructions, when executed by the root node, cause the root node to:

maintain an in-profile metric related to packets of the traffic flow that do not violate the packet classification rule; and maintain an out-of-profile metric related to packets of the traffic flow that violate the packet classification rule.

11. The non-transitory computer readable storage medium of claim 10, wherein the instruction for determining if a metric associated with the traffic flow violates the packet classification rule by being greater than a predetermined threshold comprise instructions, when executed by the root node, cause the root node to determine whether $$\frac{\text{the out-of-profile metric}}{(\text{the in-profile metric} + \text{the out-of-profile metric})} > \text{the predetermined threshold.}$$

12. The non-transitory computer readable storage medium of claim 9, having further computer-executable instructions stored thereon that, when executed by the root node, cause the root node to:

identify a source of the traffic flow that violates the packet classification rule by being greater than the predetermined threshold;

select at least one upstream agent node arranged between the source of the traffic flow and the root node; and transmit the policer policy to the upstream agent node.

13. The non-transitory computer readable storage medium of claim 9, wherein the instructions for transmitting the policer policy to one or more of the agent nodes comprise instructions, when executed by the root node, cause the root node to transmit a message comprising the packet classification rule, the corresponding police action and an enforcement period, wherein the policer policy is enforced by the one or more agent nodes during the enforcement period.

14. The non-transitory computer readable storage medium of claim 13, having further computer-executable instructions stored thereon that, when executed by the root node, cause the root node to transmit a refresh message to one or more of the agent nodes to extend the enforcement period.

15. The non-transitory computer readable storage medium of claim 9, having further computer-executable instructions stored thereon that, when executed by the root node, cause the root node to transmit a delete message to one or more of the agent nodes to cancel the policer policy.

16. A packet-forwarding node for providing a self-stretching policer in a Quality of Service (QoS) community, comprising:

a processing unit; and a memory operably coupled to the processing unit, the memory having computer-executable instructions stored thereon that, when executed by the processing unit, cause the packet-forwarding node to:

maintain a policer policy including at least one packet classification rule and corresponding police action;

enforce the policer policy by taking the corresponding police action if a traffic flow that violates the packet classification rule;

collect policer statistics;

determine if the traffic flow violates the packet classification rule by being greater than a predetermined threshold based on the collected policer statistics; and if a metric associated with the traffic flow violates the packet classification rule by being greater than the predetermined threshold, transmit the policer policy to one or more agent nodes in the QoS community, including a given agent node adjacent and upstream to the packet-forwarding node from which the traffic flow is directed, wherein the transmitted policer policy message causes the given agent node to take corresponding police action if a traffic flow, including a short-duration burst traffic, received thereat, violates the packet classification rule of the policer policy message, and wherein the one or more transmitted policer policy messages cause the packet classification rule associated therewith to be dynamically stretched to and withdrawn from each of the one or more agent nodes that received a given policer policy message.

17. The packet-forwarding node of claim 16, wherein the instructions for collecting policer statistics comprises instructions, when executed by the root node, cause the root node to:

maintain an in-profile metric related to packets of the traffic flow that do not violate the packet classification rule; and maintain an out-of-profile metric related to packets of the traffic flow that violate the packet classification rule.

18. The packet-forwarding node of claim 17, wherein the instruction for determining if a metric associated with the traffic flow violates the packet classification rule by being greater than a predetermined threshold comprise instructions, when executed by the root node, cause the root node to determine whether to determine whether $$\frac{\text{the out-of-profile metric}}{(\text{the in-profile metric} + \text{the out-of-profile metric})} > \text{the predetermined threshold.}$$

19. The packet-forwarding node of claim 16, wherein the memory has further computer-executable instructions stored thereon that, when executed by the processing unit, cause the packet-forwarding node to:

identify a source of the traffic flow that violates the packet classification rule by being greater than the predetermined threshold;

select at least one upstream agent node arranged between the source of the traffic flow and the packet-forwarding node; and transmit the policer policy to the upstream agent node.

20. The packet-forwarding node of claim 16, wherein transmitting the policer policy to one or more of the agent nodes further comprises transmitting a message comprising the packet classification rule, the corresponding police action and an enforcement period, wherein the policer policy is enforced by the one or more agent nodes during the enforcement period.

* * * * *